Sept. 20, 1932.　　J. GARDNER ET AL　　1,878,630
OIL FILTER
Filed May 26, 1930　　2 Sheets-Sheet 1

J. Gardner
J. H. S. Gardner
INVENTORS

Sept. 20, 1932.     J. GARDNER ET AL     1,878,630
OIL FILTER
Filed May 26, 1930     2 Sheets-Sheet 2

J. Gardner
J. H. S. Gardner
INVENTORS
By Marks & Clerk
ATTYS.

Patented Sept. 20, 1932

1,878,630

UNITED STATES PATENT OFFICE

JOSEPH GARDNER AND JOSEPH HUGH STOTT GARDNER, OF PATRICROFT, NEAR MANCHESTER, ENGLAND, ASSIGNORS TO L. GARDNER & SONS LIMITED, PATRICROFT, NEAR MANCHESTER, ENGLAND, A BRITISH COMPANY

OIL FILTER

Application filed May 26, 1930, Serial No. 455,887, and in Great Britain January 18, 1930.

This invention relates to filters for the fuel oil used in compression ignition types of internal combustion engines and comprises an improved construction and arrangement of filter which also serves to heat the fuel oil so as to facilitate its passage through the filtering material.

Referring to the accompanying sheets of explanatory drawings:—

The same reference letters in the three views indicate the same parts.

Figure 1:
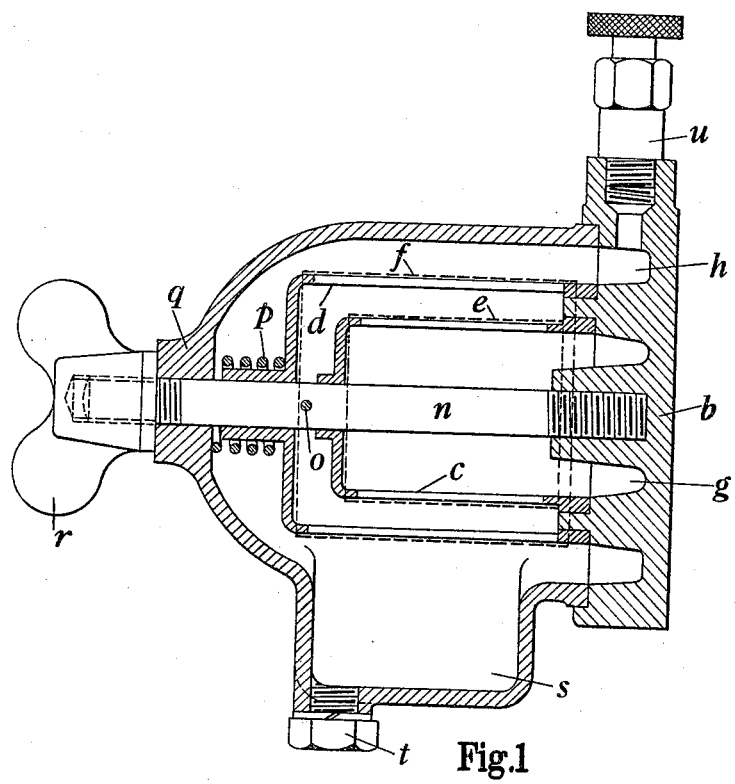
Figure 1 is a sectional elevation of a fuel oil filter constructed in accordance with our invention.
Figure 2:
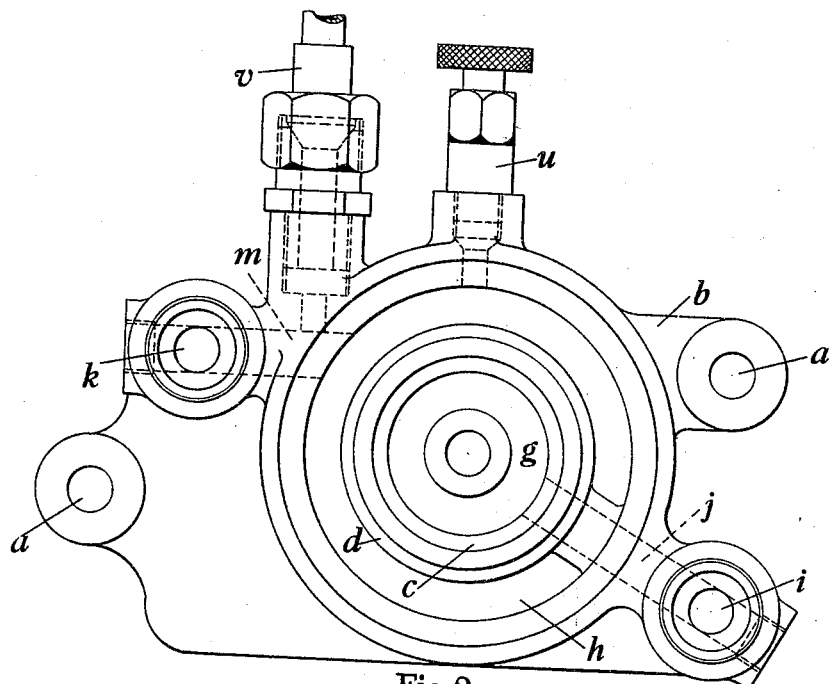
Figure 2 is a view looking from left to right of Figure 1 showing the heated base or part upon which the filtering elements are carried.
Figure 3:
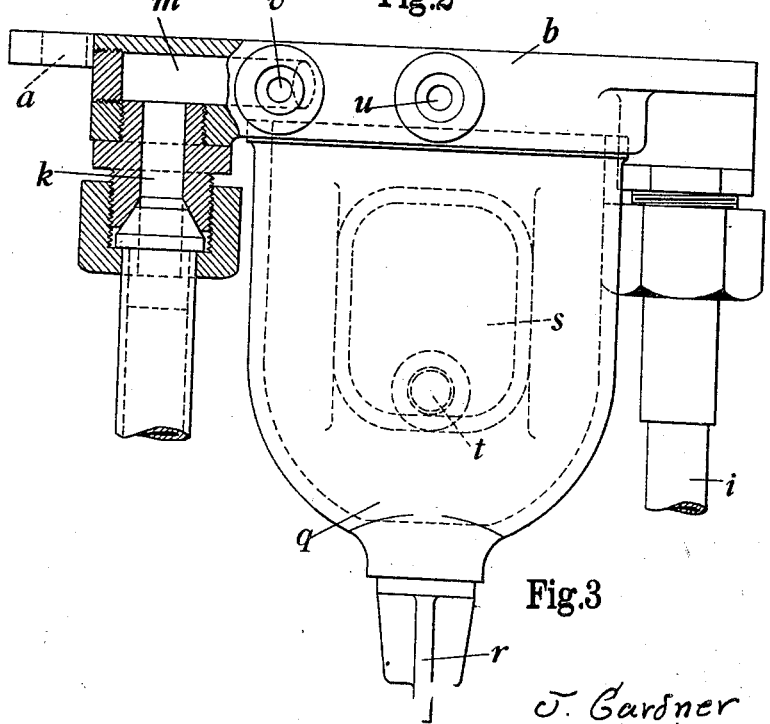
Figure 3 is a plan view of Figure 1.

The filter is arranged to be bolted or secured by means of stud bolts passing through the holes $a$, upon a hot part of the engine such as the cylinder block, the water jacket, or the exhaust manifold and the part $b$ of the filter which is in contact with or against the said hot part of the engine, is adapted to receive the ends of two concentric thimble like members $c$, $d$ upon which the filtering gauzes $e$ and $f$ are carried. Said thimbles make metal to metal contact with the heated portion $b$ of the filter casing so that the thimbles and the gauzes thereon are heated by conduction. Said heated portion $b$ of the filter casing has two concentric grooves $g$, $h$ therein, one ($g$) of which comes within the inner thimble $c$ and communicates with the oil outlet branch $i$ of the filter by the passage $j$, whilst the other ($h$) is outside the outer thimble $d$ and communicates with the fuel oil inlet branch $k$ by the passage $m$. The two thimbles are carried at one end upon a spindle $n$ which screws into the heated portion $b$ of the filter, the inner thimble $c$ being held against removal by a pin $o$ through the spindle or by other convenient means, whilst the outer thimble has a spring $p$ between itself and the filter cover or casing $q$ which is secured in place by a wing nut $r$ or the like screwing upon the outer end of the spindle $n$. Said cover or casing comprises a sump like part $s$ into which solid impurities can settle and from which they can be withdrawn through a drain cock or plug $t$.

The heated base or portion of the filter may have an air vent fitting $u$ thereon to allow of the expulsion of air from the filter, and also a connection $v$ through which fuel oil which leaks along the engine sprayer valve spindle (not shown) can return to the fuel inlet passage $m$.

As the thimbles and filtering material are heated by conduction from the hot portion of the filter, through which also the oil enters the filter, such oil is caused to flow freely through such material without the necessity for previously heating it before it enters the filter. The oil also leaves the filter through the heated passage $j$.

When the filter cover or casing $q$ is removed, the outer thimble $d$ with its gauze $f$ can be withdrawn for cleaning purposes. The inner thimble $c$ and gauze $e$ are not intended to be removed but act as a permanent guard to prevent the passage of impurities to the fuel sprayer by way of the outlet branch $i$.

What we claim is:—

1. A fuel oil filter for a compression ignition type of internal combustion engine comprising a base or portion adapted to be secured upon a hot part of the engine so as to be heated thereby, an oil inlet passage to the filter arranged in said heated part, concentric thimble-like parts with filter gauze thereon making metal to metal contact with said heated part, an annular groove formed in the said heated portion and lying outside the larger filter, the said groove being in communication with the oil inlet passage, a second annular groove formed in the said heated portion and lying inside the smaller filter, an oil inlet from the filter arranged in said heated part and communicating with the said second annular groove, and a cover for the filter secured to said heated part by a spindle which passes through the said thimbles into said heated part.

2. In a fuel oil filter as claimed in claim 1, the provision of means preventing the withdrawal of the inner thimble and of a spring between the outer thimble and the cover.

In testimony whereof we have signed our names to this specification.

JOSEPH GARDNER.
JOSEPH HUGH STOTT GARDNER.